Feb. 4, 1947.　　W. A. GIESEKE　　2,415,168
ELECTRONIC TIMER
Filed Dec. 4, 1944　　2 Sheets-Sheet 1

INVENTOR.
WERNER A. GIESEKE
BY Benedict & Swartwood
Attorneys

INVENTOR.
WERNER. A. GIESEKE
BY Benedict & Swartwood
Attorneys

Patented Feb. 4, 1947

2,415,168

UNITED STATES PATENT OFFICE 2,415,168

ELECTRONIC TIMER

Werner A. Gieseke, Danville, Ill., assignor to Samuel C. Hurley, Jr., Danville, Ill.

Application December 4, 1944, Serial No. 566,453

5 Claims. (Cl. 250—41.5)

This application is a continuation-in-part of my pending application 541,366, filed June 21, 1944.

This invention relates to an improved electronic circuit comprising an electronic timer adaptable to inspection, identifying, measuring, controlling, sorting, and other types of operation where it is useful in connection with existing machines.

One object of the invention is to provide an improved electronic circuit for use in connection with the examination, inspection, and measurement of objects.

Another object of the invention is to provide an improved means for controlling and maintaining a predetermined bias on the control grid in an electronic tube for a predetermined length of time.

Another object of the invention is to provide an improved electronic circuit for controlling a control means or control circuit used in connection with the examination, inspection, and measurement of objects which will insure that the proper control is obtained and, at the same time, maintain the speed and efficiency of the operation.

Another object of my invention is to provide a novel electronic circuit comprising an electronic timer for use in connection with photoelectric camming operations. By photoelectric camming, I mean the passing of an article through an inspection zone, and in effect taking a picture of it. In place of a mechanical reference point, I use light sensitive devices positioned to indicate when the article is in proper test position or when a portion of the article is in a predetermined position and making all other inspections from the photoelectric reference point. In other words, one photoelectric means or circuit is used to insure that the article is in proper test position from which all other inspections are made. To accomplish photoelectric camming inspections, it is an object of this invention to provide a means in an electronic circuit wherein at least two control grids in the electronic circuit are independently controlled by separate light sensitive devices or circuits. My invention is particularly applicable to photoelectric camming since it provides a means for operating the control circuit simultaneously with the inspection operation and thereby obtaining all of the advantages of photoelectric camming operations, namely, fast, accurate, and reproducible inspections. Among the uses for my electronic device and timer are the following:

1. Measuring sizes of articles. This is accomplished by photoelectric camming of the two edges of the article; and by using a calibrated indicating device in connection with the energizing means, the size of the article can be determined.

2. Checking of articles or specimens such as sheets, boxes, rounds, etc., for proper size.

3. Measuring or indicating distance between two points.

4. To operate a selecting or indicating mechanism when a predetermined position is reached.

5. Indicating, measuring, identifying, or sorting articles such as checks, time cards, etc., by determining the relative position of or between spots or lines on said articles with reference to one another or to some reference point on the article.

6. To control and maintain the proper feeding of articles such as paper, tape, sheet steel, etc., into a feeding mechanism wherein another operation takes place. A specific example of this is to control and maintain the feeding of paper into a printing press to maintain the paper in its proper relationship to the printing device. The device is particularly useful in this connection to control the relative position of the paper when color printing is used, since in color printing, the paper must be fed through the device several times, once for each color.

7. To line up articles in trimming operations such as the trimming of wood, paper, steel, books, tape, etc.

8. To control and maintain the position of articles in die-stamping, printing, cutting, trimming, etc.

9. It may also be used to indicate photoelectrically when any article enters the inspection zone or is in position in the testing zone in any inspection operation such as when one edge of an article first enters an inspection zone it would effect a light sensitive circuit which would control a control grid in an electronic circuit.

10. It is also applicable in inspection operations of the type where it is desired to measure or indicate the bevel or angle of an article, particularly in case of a round.

11. It is also useful in determining the shape of articles.

12. To determine, inspect, or indicate simultaneously two different dimensions of an article.

Among the advantages of my electronic circuit and timer are the following:

1. Speed of operation.

2. More constant operation since it inspects each piece at the same speed.

3. More positive action when used to reject bad pieces.

4. Incorporates a timing cycle which begins at the same time as the inspection cycle.

5. It permits the article inspected to be sent to the proper place.

6. It permits the control cycle to be operated simultaneously with the inspection cycle.

One of the chief uses and advantages of my device is in connection with precisional dimensional inspection of articles, for example, sizes, shape, etc., wherein such articles are sorted according to whether or not they meet the required specifications according to a photoelectric inspection. That is, the pieces are sorted according to whether they are good or bad as compared with a predetermined standard. In this type of operation, the photoelectric inspection circuit may control some type of mechanical sorting means. It is usually preferable to have the sorting means adapted and arranged so that it is normally in the reject position. This insures that if anything fails in the photoelectric inspection circuit, good pieces may be passed along with the bad pieces but bad pieces would never become mixed with good pieces, which is an essential point in photoelectric inspection operations of this kind since one purpose of such photoelectric inspection operations is to insure that no bad pieces are mixed with good ones. With the reject mechanism normally in position when the photoelectric inspection device indicates a good piece, the device must then positively actuate the accept mechanism.

In the past, it was difficult if not impossible to avoid a certain lag in placing the accept mechanism in position in place of the reject mechanism. In fast inspection operations, if sufficient time were not given for this purpose, the accept mechanism might not receive the good piece and the good piece would pass down with the bad ones. In the past, if sufficient time were given, the entire photoelectric inspection operation would be slowed down and many of the advantages of photoelectric inspection lost. However, in my invention, by providing an electronic timer for use in connection with photoelectric inspection operations, I can provide for the time required to place the accept or the reject receptacle means in position, and at the same time maintain the efficiency and speed of photoelectric inspection operations since I may carry on these two operations simultaneously in a coordinated manner. In other words, while the article just inspected is passing to the proper receptacle, the electronic timer actuated by the photoelectric inspection circuit controls this operation while the next piece is coming into position and being inspected by the photoelectric inspection operation and therefore no time is lost and yet means are provided to insure that the articles are sorted according to the results desired by photoelectric inspection.

In general, my electronic timer comprises a condenser, a resistor, and a voltage regulating tube connected in parallel across a source of alternating current, but said alternating current only flows across the timing circuit when properly actuated by the photoelectric inspection. The voltage regulator tube is preferably of the neon-glow type tube. The purpose of the voltage regulating tube is to control and fix the amount of effective charge received by the condenser. The effective charge received by the condenser is used to accomplish the objects of my invention in the following manner: The control means of the control circuit can be controlled through an electronic tube, preferably of the gas-filled arc discharge grid controlled type. The conductance of electricity by the electronic tube controls the control circuit and the length of time of such conductance by the length of time a positive bias is maintained on said tube. The bias on the electronic tube, in turn, is controlled by the amount of effective charge received by the condenser in the electronic timer circuit which has resulted from the photoelectric inspection circuit, as will be hereinafter described and explained. By effective charge on the condenser, I mean the charge over and above that required to control the bias such that the electronic tube will either conduct or not conduct. The electronic timer may either prevent the tube from conducting for a definite length of time or cause it to conduct for a definite length of time, depending upon the type of operation desired.

One of the broad embodiments of my invention comprises a first electronic circuit responsive to and controlled by the bias on the control grids on said electronic circuit through light sensitive means which are used in the photoelectric inspection operation. The flow of current through the first electronic circuit controlled by the light sensitive circuit causes and results in the control and operation of the electronic timer. The electronic timer in turn controls the flow of current through a second electronic circuit which is operatively connected to control the control means which cause the articles inspected to be segregated according to predetermined standards and according to the results of the photoelectric inspection.

In one specific embodiment, my invention comprises a first bridge circuit containing a pair of phototubes which may be used, for example, to fix the reference point for the photoelectric inspection for the size of an article. A second bridge circuit comprising a pair of phototubes is provided to make the photoelectric inspection. Each bridge circuit controls the bias on separate amplifying tubes, thereby controlling the flow of current through said amplifying tubes. A third electronic tube is connected such that its grids have their bias controlled by the flow of current through the anode circuits of the amplifying tubes to which the bridge circuits are connected such that the more current that flows through the amplifying tubes, the greater the negative bias that is placed on the control grids; therefore, when the amplifying tubes are non-conducting, the circuit is arranged such that a positive bias is placed on each of the control grids of the third electronic tube or circuit causing the third electronic tube to conduct a current. The third electronic tube is connected across a source of alternating current. In the cathode circuit of the third electronic tube is connected an electronic timer which comprises in parallel, a condenser, a resistor, and a voltage regulator tube. Thus when the current flows across the third electronic tube, the condenser is charged. A fourth electronic tube which is used for controlling the control circuit has its control grid operatively connected to the electronic timer circuit in order to maintain and control the bias on that tube. In this particular case, the condenser maintains a positive bias on the fourth electronic tube for a definite period of time which causes the relay coil and relay switch operatively connected in its anode circuit to be actuated for the requisite length of time.

Other objects and advantages of my invention will become apparent by referring to the drawings. Although my device may be used for many types of inspection operations, for the purpose of illustration, I will describe its use in connection with the testing of pieces for proper dimension and the rejectance or acceptance fo a piece according to a predetermined dimension.

Figure 1:
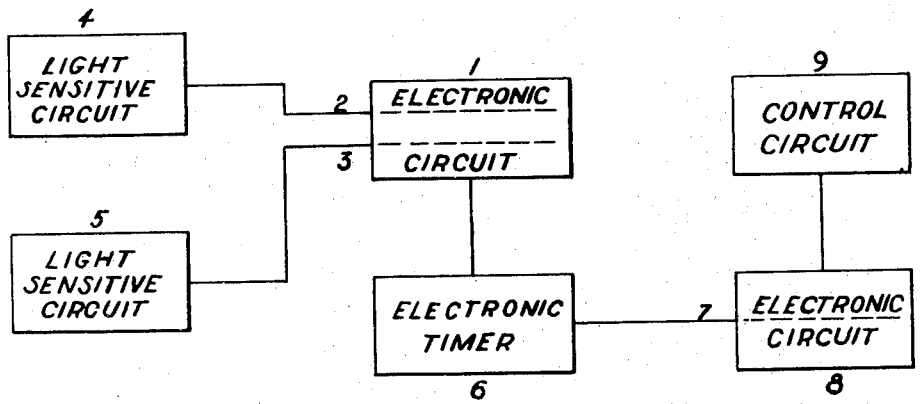
Fig. 1 is a flow diagram of an electronic circuit illustrating the broad principles of my invention.

Referring to Fig. 1, an electronic circuit 1 containing the control grids 2 and 3 is provided to obtain and indicate the response in the photoelectric inspection. The control grid 2 is operatively connected to the light sensitive circuit 4 and the control grid 3 is operatively connected with the light sensitive circuit 5. The bias on each of the control grids 2 and 3 must be driven in a positive direction simultaneously to cause an electric current to flow through the electronic circuit 1 although either light sensitive circuit 4 or 5 may prevent the flow of current through electronic circuit 1 by driving the bias of either grids 2 or 3 in a negative direction sufficient to prevent the conductance of the electronic circuit. The electronic circuit may comprise one electronic amplifier or power tube containing both the control grids 2 and 3 or the electronic circuit may comprise two separate electronic power tubes, one containing control grid 2 and one containing control grid 3. The two power tubes are connected such that both of them must be rendered capable of conducting electric current before the entire electronic circuit 1 will conduct an electric current. Furthermore, the electronic circuit 1 may comprise either two-stage amplification or one-stage amplification, the two-stage amplification being further illustrated and described in Fig. 2. Preferably, when the object being inspected is a good piece, the light sensitive circuits 4 and 5 will drive the bias on the control grids 2 and 3 in the electronic circuit 1 in a positive direction, thereby rendering the electronic circuit 1 conducting. The electronic circuits 1 and 8 and timer 6 are connected to a suitable source of alternating current.

Figure 2:
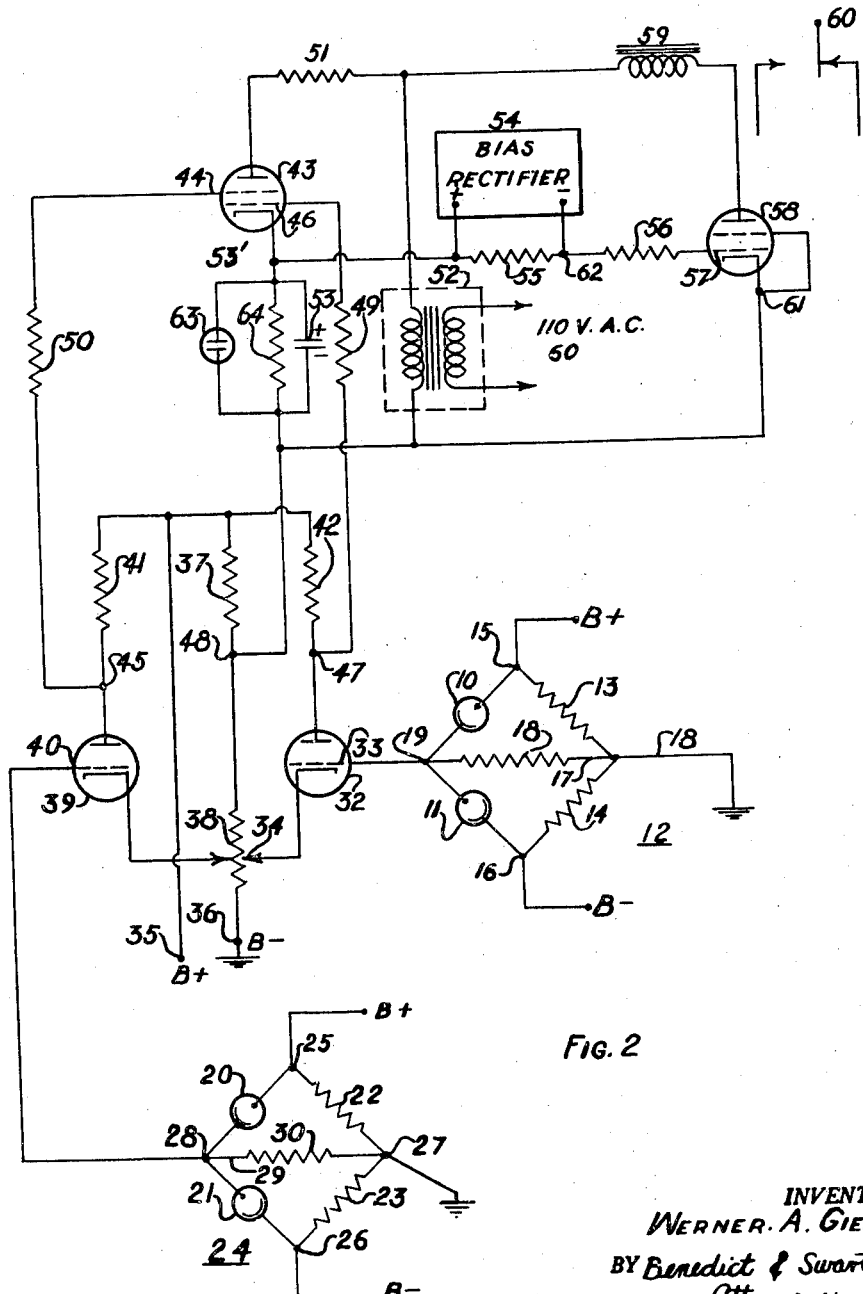
Fig. 2 is a detailed wiring diagram illustrating one specific application of my device.

When the electronic circuit 1 is conducting, it will control the electronic timer 6 which preferably comprises a condenser, a resistor, and a voltage regulating tube connected in series as shown, for example, in Fig. 2. It should be noted that by a positive bias, I mean a bias sufficient to cause an electronic tube to conduct a current although in some cases, depending upon the electronic properties of the tube, the tube will conduct a current when the bias is of the order of a minus 2–5 volts, depending on the characteristics of the individual tube.

When a flow of current passes through electronic circuit 1, the timer 6 will acquire a positive or a negative charge, depending upon the specific method employed. This charge, in turn, controls the bias on the control grid 7 of the electronic circuit 8. The electronic circuit 8 may comprise a single electronic tube containing the control grid 7 or may comprise one or more stages of amplification, but in general involves the control of the bias of a grid in one of the stages of amplification. The length of time of and the kind of bias imposed upon the control grid 7 by the electronic timer as the result of the flow of current through the inspection circuit 1 determines the length of time that the electronic circuit 8 conducts or does not conduct a current, which, in turn, controls the control circuit 9. Although I have not illustrated the specific apparatus including the mechanical parts, the arrangement of the phototubes and the optical system for accomplishing the results of my invention, since such details are known and form no part of my invention. A description of the method of inspection when using the wiring diagram illustrated in Fig. 1 is as follows:

The article to be inspected is brought into inspection position. The light sensitive circuit 4 may be used to photoelectrically fix the reference point of the article and if the article is properly positioned, it will cause a positive bias to be placed on the control grid 2 of the electronic circuit 1. If the article is of the proper size, the response in the light sensitive circuit 5 will be such as to also place a positive bias on the control grid 3 of the electronic circuit 1. With the bias positive on both control grids 2 and 3, the electronic circuit will conduct a current and the electronic timer will be actuated for the control of grid 7 of electronic circuit 8, thereby controlling the conductance of circuit 8. The control circuit 9 responsive to and controlled by the conductance of circuit 8 sends the article to the proper place. By the use of electronic timer 6, the article, while passing to the proper place by the control circuit 9, will not interfere with the next piece to be introduced into the inspection zone for its inspection and therefore no time is lost in the passing of the article to its proper place, since the operation of 6, 8, and 9 can be carried on simultaneously with the operation of 1, 4, and 5 if the entire system is properly correlated. That is to say, if the next piece inspected is also good and properly positioned, no change occurs in timer 6, circuit 8, and control circuit 9, and as long as all pieces are good, there will be a continuous flow of the pieces to the accept receptacle. However, if the next piece tested is bad, by the time the photoelectric inspection determines this, the timer will have controlled the sending of the good piece to the proper receptacle and a change will occur in the timer 6, control circuit 8, and circuit 9 which will cause the bad piece to go to the reject receptacle. While I have illustrated the above in connection with normally having the control circuit send the articles to the reject receptacle, unless some positive action as caused by the inspection of a good piece occurs, it is within the scope of my invention to have either good or bad pieces sent to the correct receptacle and by the positive action of circuits 4 and 5 and the correlated response in circuits 8 and 9. Thus, using the broad principles illustrated in Fig. 1, I retain all the advantages of photoelectric camming operations by the use of my novel electronic timer and I provide a novel circuit employing both photoelectric camming and the electronic timer to accomplish the objects of my invention.

Referring to Fig. 2, light sensitive devices 10 and 11 are provided in a bridge circuit 12 which also contains resistors 13 and 14. The bridge circuit is connected across a source of D. C. potential at points 15 and 16. A connection 17 containing resistor 18 connects the bridge from points 18 to 19. Similarly, a second bridge circuit 24 contains phototubes 20 and 21 and resistors 22 and 23. The second bridge circuit 24 is connected across a source of D. C. potential at points 25 and 26 and a connection to be made across the bridge from points 27 and 28 by means of line 29 containing resistor 30. The two bridge circuits 12 and 24 containing the phototubes 10, 11, 20, and 21 may be used, for example, to determine the length of an article such as the article 31 illustrated in Fig. 3. When the article 31 is of the proper length, phototubes 10 and 20 are placed in shadow, whereas phototubes 11 and 21 remain in light. Under these conditions, it is obvious that a negative potential is placed on points 19 and 28 of the bridge 12 and 24, respectively.

Figure 3:
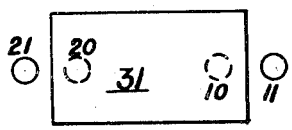
Fig. 3 illustrates the use and location of the phototubes connected in the electronic circuit of Fig. 2.

Referring again to Fig. 2, an amplifying tube 32 containing control grid 33 is provided in which the control grid 33 is connected to the point 19 of the bridge 12 thereby controlling the bias on the grid 33. The amplifying tube 32 may be either of a vacuum type or the gas-filled arc discharge type and is preferably of the thermionic type. When the bridge 12 is in balance the control grid 33 is at ground potential whereas the cathode of the tube 32 is connected at point 34 substantially above ground potential and the tube 32 is rendered non-conducting. The operating voltage and current for the tube 32 is obtained from a direct current source of potential having its positive terminal at 35 and its negative terminal at 36 and through dividing resistors 37 and 38. Similarly, amplifying tube 39 containing control grid 40 is provided with the control grid 40 connected to the points 28 of bridge 24 where it is obvious that when the bridge 24 is in balance, current will flow through the tube 39. It is also obvious that if the bridge 24 or the bridge 12 is unbalanced, as when phototube 20 is in light and 21 is in shadow or phototube 10 is in light and phototube 11 is in shadow, that a still greater positive bias is placed respectively on controls 40 and 33 and electronic tubes 32 and 39 have their bias driven in a still greater direction of positive potential. However, when the article 31 is of the proper size as illustrated in Fig. 3, phototube 10 is in shadow and 11 is in light, phototube 20 is in shadow and 21 is in light and the respective grids 40 and 33 are driven in a negative direction which stops the flow of current through the electronic tubes 39 and 32. In the cathode circuits of tubes 39 and 32 are connected resistors 41 and 42, respectively. These resistors are loading resistors. An electronic power tube 43, preferably of the gas-filled arc discharge type, contains control grid 44 connected to point 45 in the anode circuit of the electronic tube 39 and control grid 46 connected at point 47 in the anode circuit of amplifying tube 32. The cathode of the tube 43 is connected to the point 48. When no current flows through tubes 32 and 39, points 45, 48 and 47 are substantially at the same potential and current will flow through the tube 43. However, for example, if current is flowing through electronic tube 32, due to the load resistor 42 in the anode circuit point 47 will be driven in a negative direction in respect to point 48 and the bias on the control grid 46 will be driven in a negative direction so as to prevent a flow of current through the tube 43. Similarly, if current flows through the tube 39, as is the condition when the bridge 24 is in balance, point 45, due to the load resistors 41, will be driven in a negative direction in respect to point 48 in which the cathode of tube 43 is connected and this independently can stop the flow of current through the tube 43. Thus, tube 43 can only conduct when both bridge circuits 12 and 24 are unbalanced in a negative direction of potential as is the case when phototubes 10 and 20 are in shadow and phototubes 11 and 21 are in light which is the condition for a proper sized article 31 as shown in Fig. 3.

Limiting resistors 49 and 50 are provided to prevent an excessive potential being placed on the control grids 44 and 46. When the tube 43 ionizes or conducts, a current from the A. C. source of potential at 52 flows through the anode circuit of the tube 43 through the resistor 51. This flow of current charges the condenser 53 so as to place a sufficiently high positive potential on the point 53 that it will overcome the negative potential placed by the bias rectifier 54 connected in parallel with the resistor 44 and place a positive potential or bias reduced somewhat by the limiting resistor 56 on the control grid 57 of the power tube 58, thus permitting tube 58 to ionize or conduct. Tube 58 is preferably of the gas-filled arc discharge type, although other suitable types may be used. When tube 59 ionizes or conducts, A. C. current from the source 52 will flow through the anode circuit and energize the relay coil or energizing mechanism 59 which will actuate the relay switch 60. The relay switch 60 is shown in such a position that it rejects an article of improper size. When the relay coil 59 actuates the relay switch 60, it places the article in a position to be accepted (such mechanism not illustrated). Thus, it should be noted that unless tube 58 is ionized, all articles will be rejected. Tube 58 has its shield grid connected directly to the cathode of the tube.

Tube 58 has its control grid bias measured between the points 61 and 62. The control grid 44 has its bias measured between the points 45 and 48 and the control grid 46 has its bias measured between the points 47 and 48.

As previously explained, condenser 53 is charged when the tube 43 ionizes or conducts, due to a flow of current through the anode circuit of that tube. A voltage regulating tube which is preferably a neon tube 63 is connected in parallel with condenser 53 and the resistor 64 and is so regulated and adjusted to obtain the desired charge on the condenser 53. The neon tube and condenser serve an important function in my invention. The neon tube 63 controls the amount of charge on the condenser 53, which in turn, controls the length of time that the tube 58 conducts at the end of an inspection of a good piece or a piece having the proper dimension. If it were not for the electronic timer, if a good piece were inspected and the next piece bad, tube 43 would not ionize and tube 58 would be unable to ionize and the relay switch 60 would snap back into reject position and the good piece would not have time to pass into the accept receptacle. By the use of my timing device comprising the condenser 53 and neon tube 63, a timing effect is obtained which keeps tube 58 ionized long enough to maintain the relay switch 60 in the accept position even though the next piece were bad and tube 43 were unable to ionize. The capacity of the neon tube 63 determines the amount of charge on the condenser 53 and thus the length of timing is controlled.

Briefly, the operation of a complete cycle of the device described and illustrated in Fig. 2 is as follows: A good piece properly positioned comes into inspection position and places phototubes 10 and 20 in shadow, phototubes 11 and 21 remaining in light. This unbalances the bridges 12 and 24 in a negative direction of potential and stops the flow of current through the amplifying tubes 30 and 32, respectively. This causes a positive bias placed on the control grids 44 and 46 and the tube 43 will conduct a current from the source of A. C. potential at 52. The flow of current through tube 43 causes a flow of current to flow through its cathode circuit and charges the condenser 53 up to the capacity of the neon tube 63. The positive charge caused by the condenser 53 at the point 53 overcomes the negative bias being maintained on the control grid 57 of the tube 58 by the bias rectifier 54 and the tube 58 will conduct a current, actuating the relay switch 60 and causing the piece to continue along its way to the accept receptacle since the condenser 53 will maintain that positive bias depending on its charge for the length of time it takes for the charge to leak back through the resistor 64 until the charge at point 53' again cannot overcome bias rectifier 54. Without any loss of time, the next article may be placed into the inspection position and if it is a good piece, the entire system maintains the status quo and it will also pass into the accept receptacle. However, if the next piece introduced into the inspection zone is a bad one or if it is not properly positioned in the inspection zone, the electronic tube 43 will not conduct a current and the condenser 53 will not overcome the negative charge placed on the control grid 57 due to the bias rectifier and the tube 58 will not conduct a current and the relay switch 60 will return to the reject position, after the timer has completed its function as explained above.

Figure 4:
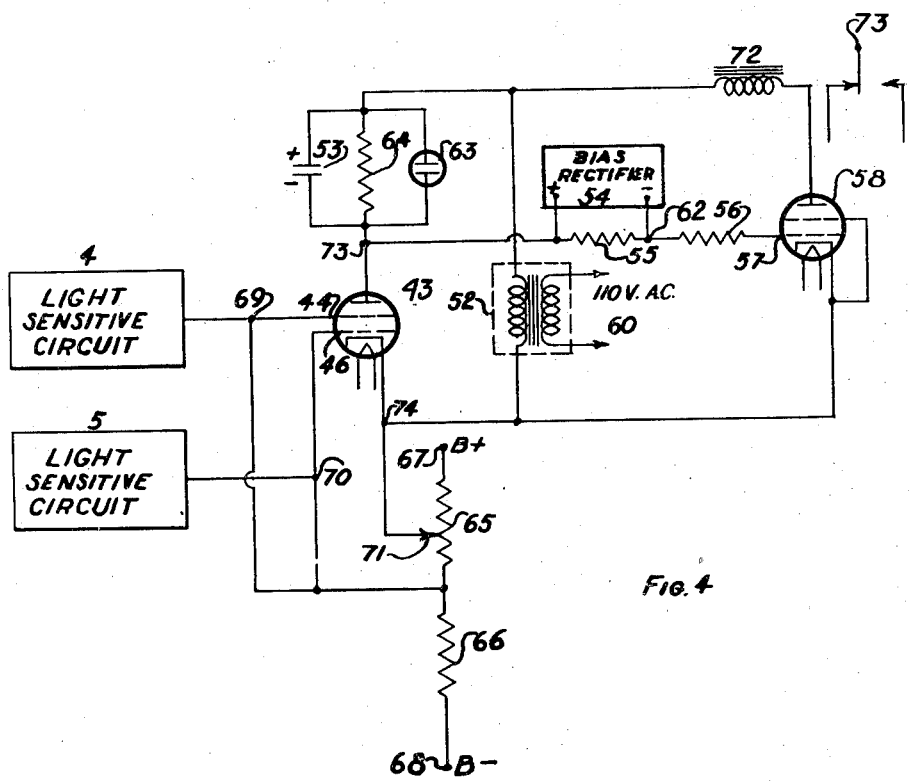

It is understood that while I have described my invention in connection with inspection operations of the type where it is desired to sort objects according to a predetermined size, my invention is applicable to other operations wherein after a desired operation is made by photoelectric means, my timing device will cause another operation to function during a predetermined length of time. For example, instead of the relay switch 73 of Fig. 4 operating an accept and reject mechanism, it may act as a control means for determining the time of exposure for an X-ray operation or perhaps a photographic picture or for maintaining printing presses in contact with a paper for a definite length of time, especially in color printing work.

My invention is only limited by the following claims.

I claim as my invention:

1. An electronic circuit comprising a source of alternating current, a first electronic tube containing at least one control grid connected with said source of current, a light sensitive circuit containing at least one light sensitive device, means for controlling the bias of said control grid by the light sensitive circuit, an electronic timer positioned in the cathode circuit of said first electronic tube and under the control of said first electronic tube, said electronic timer comprising in parallel a condenser, a resistor and a voltage regulating tube, said voltage regulating tube controlling the amount of charge receivable by said condenser when current flows through the first electronic tube as controlled by the light sensitive device, a second electronic tube containing at least one control grid, said second electronic tube also connected across said source of alternating current and said second electronic tube having its control grid operatively connected to the cathode circuit of the first electronic tube such that the two tubes are in phase, said last mentioned control grid being further controlled by the electronic timer, such that the bias of the last mentioned control grid is controlled for pre-determined length of time after current ceases to flow through the first electronic tube.

2. An electronic circuit comprising a first electronic tube containing two control grids, each control grid having its bias operatively controlled by separate light sensitive circuits, each circuit containing at least one light sensitive device, an electronic timer positioned in the cathode circuit of said first electronic tube and under the control of said first electronic tube, said electronic timer comprising in parallel a condenser, a resistor, and a voltage regulating tube, said voltage regulating tube controlling the amount of charge receivable by said condenser when current flows through the first electronic tube as controlled by the light sensitive device, a second electronic tube containing at least one control grid, said second electronic tube also connected across said source of alternating current and said second electronic tube having its control grid operatively connected to the cathode circuit of the first electronic tube such that the two tubes are in phase, said last mentioned control grid being further controlled by an electronic timer, such that the bias of the last mentioned control grid is controlled for pre-determined length of time after current ceases to flow through the first electronic tube.

3. In an apparatus of the class described for maintaining a positive bias on the control grid of a first electronic tube for a predetermined length of time comprising an electronic timer positioned in the cathode circuit of a second electronic tube, said electronic timer comprising a condenser, a resistor, and a voltage regulating tube connected in parallel, said voltage regulating tube fixing the maximum charge receivably by the condenser when current flows through the second electronic tube, said second electronic tube and first electronic tube being connected so that they operate in phase, said maximum charge on said condenser controlling the positive bias on the first electronic tube for a predetermined length of time after current ceases to flow through the second electronic tube.

4. In an inspection circuit, a source of alternating current, a first electronic circuit connected to said source of alternating current, an electronic timer responsive to and under control of the flow of current through first electronic circuit, a second electronic circuit connected to said source of alternating current, the flow of current through said second electronic circuit responsive to the electronic timer and said electronic timer comprising in parallel a condenser, a resistor and a voltage regulating tube, said voltage regulating tube fixing the maximum charge receivable by said condenser when current flows through the first electronic circuit.

5. Means for controlling the bias of a control grid in an electronic circuit and for maintaining a predetermined bias for a predetermined length of time, comprising an electronic timer circuit, including a voltage regulating tube, a condenser and a resistor connected in parallel, said voltage regulating tube controlling the maximum amount of charge receivable by said condenser when a current is passed through said timing circuit, thereby controlling and maintaining the bias on said control grid for a time corresponding to the maximum charge receivable by said condenser.

WERNER A. GIESEKE.

REFERENCES CITED

The following references are of record in the file of this patent:

UNITED STATES PATENTS

| Number | Name | Date |
|---|---|---|
| 2,231,621 | Goodridge | Feb. 11, 1941 |
| 2,084,186 | Braden | June 15, 1937 |
| 2,099,764 | Touceda | Nov. 23, 1937 |
| 2,375,130 | Perrin et al. | May 1, 1945 |

FOREIGN PATENTS

| Number | Country | Date |
|---|---|---|
| 678,145 | French | Mar. 19, 1930 |